Figure 1:
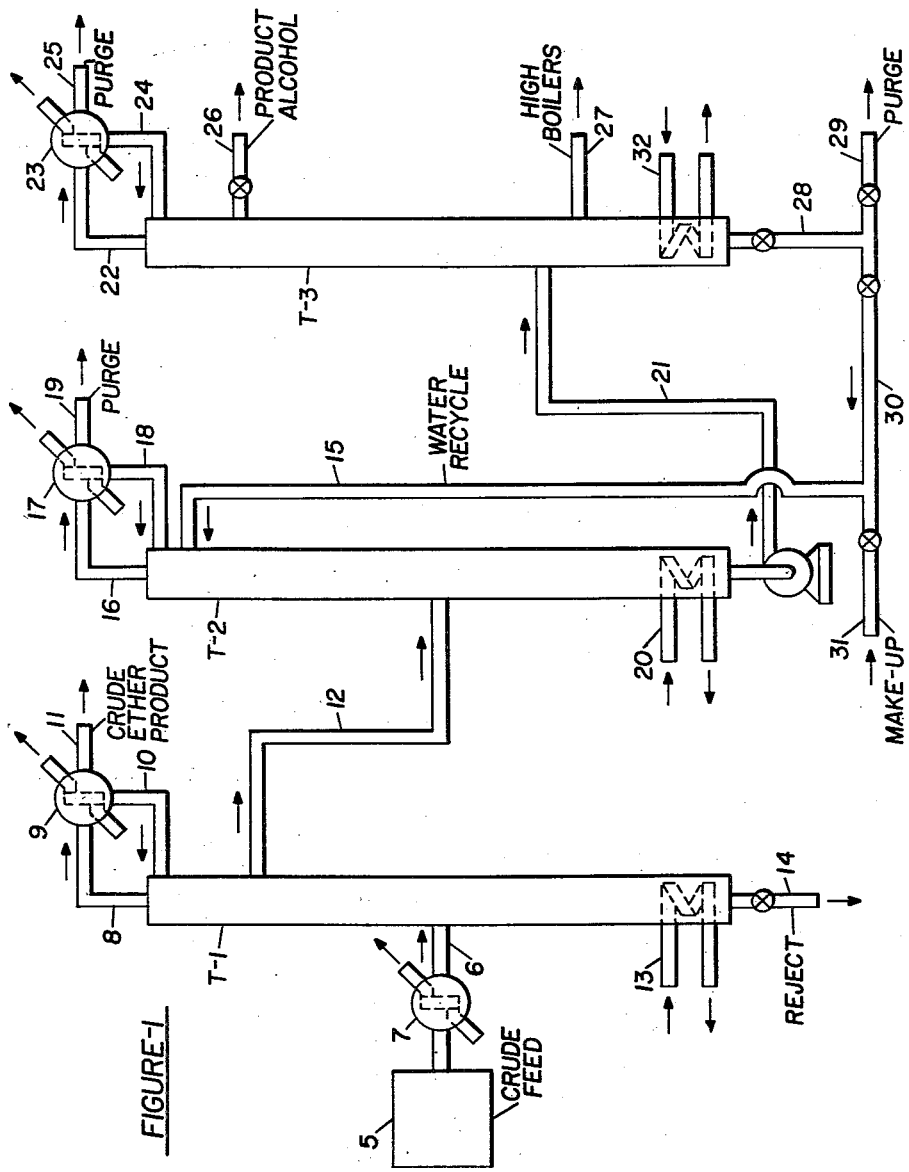

United States Patent Office 2,806,816
Patented Sept. 17, 1957

2,806,816
PROCESS FOR IMPROVING ALCOHOL QUALITY

John H. Staib, Plainfield, and Erving Arundale, Westfield, N. J., assignors to Esso Research and Engineering Company, a corporation of Delaware Application September 15, 1955, Serial No. 534,450

5 Claims. (Cl. 202—39.5)

This invention is concerned with a process for improving the quality of a crude alcohol formed by acid catalyst hydration of an olefin, and relates more specifically to saturated aliphatic alcohols in the $C_2$–$C_4$ range e. g. ethyl, isopropyl and secondary butyl.

The crude alcohols made by the hydration of olefins contain certain impurities which are present in low concentrations and are very difficult to remove using conventional methods of distillation, such impurities including ethers, aldehydes, aldols, hydrocarbon polymers, sulfur-containing compounds, Dowtherm (diphenyl ether and diphenyl) and unsaturated carbonyls. In order to produce finished alcohols of superior quality, these impurities must be completely eliminated or reduced to extremely low concentration levels. It is known that a number of the impurities mentioned, such as some of the low boiling impurities, can be removed in varying degrees by a water extractive distillation process, as described in the U. S. Patent 2,638,440 of Drout et al.

However, certain impurities, such as the aldols, are not removed in the forementioned manner, and these impurities, being thermally unstable and relatively high boiling, decompose on distillation to yield unsaturated aldehydes which remain in the final alcohol distillate product. Since the high boiling aldols remain in the bottoms streams, some decomposition occurs in each tower releasing the more volatile unsaturated carbonyls. These carbonyls thus formed contaminate all overhead and side withdrawal streams. The product alcohol thus possesses poor quality with respect to permanganate time. Therefore, the present invention has the object of improving a distillation finishing process so that such impurities as tend to be formed in the ordinary distillation procedures are effectively removed.

Other high boiling impurities such as Dowtherm, polymeric hydrocarbons and sulfur compounds, degrade odor but have little effect on permanganate time. While Dowtherm is not an impurity formed as an undesirable by-product in the synthesis stage, it is nevertheless normally present in the crude alcohol from commercial operations by virtue of leaks in the heat exchange equipment which utilize Dowtherm as the heating medium (such as the coils in the acid concentrating equipment). These impurities also respond to the water rejection technique of this invention.

Although is is not intended that the invention be limited by any theory, studies have shown that some organic impurities present in the olefin hydration alcohols behave like hydroxyl-carbonyls or aldols which give most difficulty in separation and are not removed even with the use of water extractive distillation process. In recovering the crude olefin hydration alcohols, the alcohols are generated or distilled from a dilute acid extract, e. g. 40 to 60% sulfuric acid, and the aqueous alcohol vapors generally have to be scrubbed with aqueous caustic to neutralize entrained acid. The resulting alcohol distillates from the caustic scrubbing zone contain hydroxy-carbonyl compounds of the type formed by an aldolization reaction. These compounds, herein termed aldols, will dehydrate when heated, even in the presence of water, and they then form unsaturated carbonyls. The dehydration occurs in both conventional distillation or water extractive distillation operations thus leaving the alcohols contaminated with unsaturated carbonyls. The present invention provides a method of removing the detrimental aldol compounds effectively before they have an opportunity to decompose and contaminate the alcohols with unsaturated carbonyls.

The improved finishing process of the present invention will be described with reference to the manufacture and purification of ethanol, although it can be applied to other $C_2$–$C_4$ alcohols, e. g. isopropanol and secondary butanols.

Ethylene is absorbed under pressure in 95 to 99% sulfuric acid at 75° C. The absorption of the ethylene is carried out in an absorption zone such as a tower equipped with means for dispersing the olefin gas into contact with a countercurrent stream of the acid. The absorption results in formation of an acid extract containing ethyl hydrogen sulfate and diethyl sulfate (about 1.3 moles ethylene per mole of sulfuric acid). The acid extract is diluted with water to release ethanol by hydrolysis. In the absorption and hydrolysis reactions, ether and other byproducts are formed. Following the hydrolysis, the alcohol is stripped from the acid in a so-called generator. The alcohol is distilled with water and contaminants and the distilled vapors are subjected to scrubbing with aqueous caustic to remove entrained acid. The vapors withdrawn from the caustic scrubber may then be condensed or be sent directly to the distillation finishing system.

Flow diagrams of a distillation finishing system are shown in the accompanying drawings for purposes of illustrating procedures used in obtaining finished high quality ethanol in accordance with the present invention.

Figure 2:
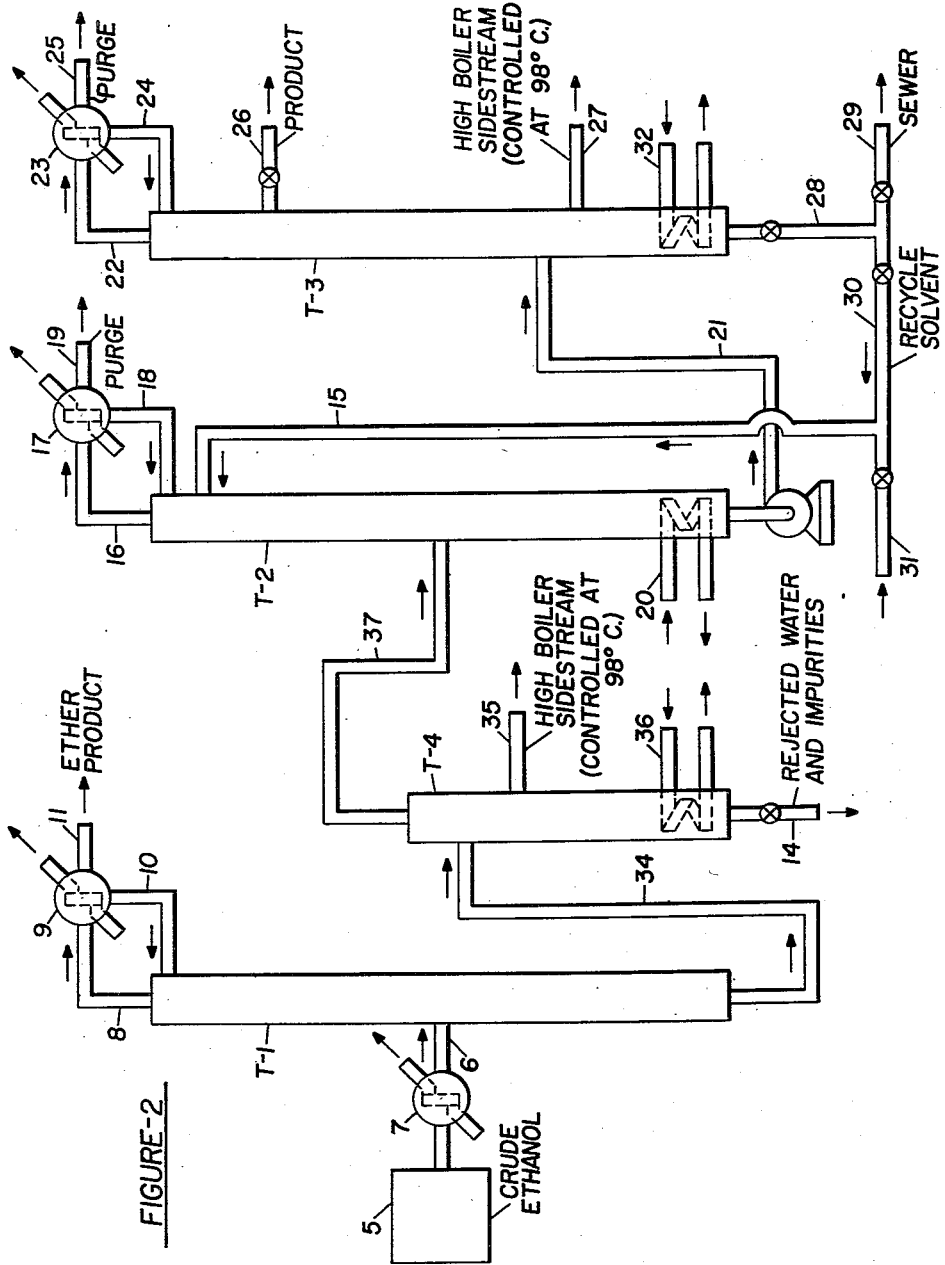

Fig. 1 illustrates a procedure which employs basically three columns for the finishing operation. Fig. 2 shows a preferred modification of the operation in which a separate column is used for removal of low-boiling impurities and water rather than a single column as shown in Fig. 1. The four tower arrangement is preferable over the three tower arrangement to prevent loss of ether byproduct through the alcohol side stream of the first tower.

Referring to Fig. 1, the crude aqueous ethanol distillate diluted with water to contain preferably above 25 volume percent of water and more preferably about 50 to 75% of water is fed into the initial tower T–1. Tower T–2 is the water extractive distillation tower and tower T–3 serves to reconcentrate the alcohol product.

The crude alcohol is taken from tank 5 to be passed by line 6 into tower T–1. This crude alcohol feed should contain preferably above 25 volume percent, and more preferably about 50 to 75 volume percent of water. This feed may be preheated in heat exchanger 7 and is passed preferably into a midportion of T–1, e. g. the 20th plate of the total 40 plates in the column. The tower T–1 is operated under conditions to remove overhead through line 8 low-boiling impurities including by-product ether. The overhead vapors are passed through a cooling condenser 9 and a portion of the condensate may be refluxed to the top of T–1 by line 10. Remaining overhead distillate is withdrawn by line 11. An intermediate distillate fraction, such as condensate on a plate between the feed plate and the top plate of the tower T–1, is withdrawn through line 12. The composition of this intermediate fraction will normally be close to that of the aqueous alcohol azeotrope, namely, 95 volume percent ethanol and 5 volume percent water.

Below the feed plate in T–1, the crude alcohol is subjected to stripping action and is heated to a temperature at which practically all the alcohol is distilled out, leaving an aqueous residue such as contains about 95 volume percent of the water present in the feed.

The bottoms fraction in the treatment of crude aqueous ethanol becomes heated to a temperature of about 100° to 110° C. by a reboiler coil or open stream 13. The residual aqueous residue or rejected water portion is withdrawn through the bottom of T-1 through line 14. This residue contains most of the higher boiling impurities mentioned earlier and, in particular, most of the aldols and any Dowtherm (diphenyl ether) introduced from heat exchanger leakage.

The intermediate aqueous ethanol fraction withdrawn by line 12 tends to contain small amounts of impurities of the order of 1% or less. Generally, this stream will contain even less than 1 p. p. m. of the very detrimental impurities (aldol and Dowtherm) which are extremely difficult to remove by conventional distillation or water extractive distillation. For complete purification of the intermediate aqueous ethanol fraction, stream 12 is supplied into an intermediate part of the water extractive distillation tower T-2, e. g. the middle plate in a 40 plate column. Enough water is supplied through line 15 at one of the top plates to maintain above 70 mole percent water in the internal reflux, preferably about 90 to 95 mole percent water concentration therein. In the water extractive distillation tower T-2 there is little variation in temperature from between the water feed plate and the bottom of the tower because the water concentration is high. Temperatures in T-2 above and below the feed plate will tend to be in the range of 90° to 100° C. Atmospheric or superatmospheric pressures may be maintained in T-2. Under these conditions not only do impurities normally lower boiling than the alcohol become volatile, but also other impurities, which are substantially higher boiling than the alcohol distill overhead. With the impurities a large amount of water vapor is distilled overhead and passed by line 16 into condenser 17, a portion of the overhead condensate may be refluxed through line 18. The remaining distillate is withdrawn through line 19.

Reboiling means for example, by a steam coil such as 20, are used in the bottom part of tower T-2, and steam may be injected into the tower. Aqueous bottoms, containing the alcohol with satisfactory diminished amounts of detrimental impurity, is withdrawn from the bottom part of T-2 through line 21 for passage into the rectifying or concentrating column T-3.

Tower T-3 may be equipped with more plates or equivalent fractionating means than are employed in the preceding columns. In T-3 the aqueous alcohol azeotrope vapors pass upwardly to the top. In using a single column for the concentration of the alcohol, the low-boiling impurities are withdrawn overhead through line 22 into condenser 23, a portion of overhead condensate may be refluxed through line 24, the remaining portion of the overhead distillate being withdrawn through line 25. This overhead distillate contains small amounts of impurities. Purified alcohol in an aqueous azeotrope composition is withdrawn as a side stream from an upper plate through line 26, e. g. as at the 50th plate or 5 plates below the top plate.

Some of the high boiling oily impurities may be removed with water from plates below the feed inlet plate. For example, using the 15th plate from the bottom as the feed plate, a portion of the aqueous reflux containing oils is withdrawn about 4 to 5 plates below the feed plate through line 27. Remaining portions of the aqueous bottoms stripped of alcohol in the concentrating column T-3 may be withdrawn through line 28. A portion of the bottoms may be purged through line 29. Another portion of the bottoms may be recycled through lines 30 and 15 to the upper part of the water extractive distillation tower T-2 as solvent. Fresh makeup water may be added from line 31. Any amount of the bottoms from column T-3 may be purged, and the purged material may be replaced by added fresh water. Reboiling by means of a steam coil 32 or open steam is provided in the bottom part of T-3.

When a small purge stream is withdrawn from the top of T-3 by line 25 to remove trace amounts of low boiling contaminants, a high purity alcohol product is withdrawn as a liquid side stream about 5 plates below the top plate by line 26.

In Fig. 2 similar parts, which function as in Fig. 1, are given the same reference numerals.

The main difference between the operation of Fig. 1 and Fig. 2 is in the use of a separate stripping tower T-4 to accomplish the water rejection. The bottoms are withdrawn from T-1 through line 34 and are passed into an upper part of the water rejection section in tower T-4; for example, at the 15th plate with 20 plates in T-4.

High boiling impurities may be withdrawn as a side stream through line 35 from T-4. The major portion of the aqueous impurities are withdrawn from T-4 through line 14. Reboiling means, such as a steam coil 36 or open steam is provided in the bottom part of tower T-4. The intermediate aqueous alcohol fraction is taken overhead from T-4 through line 37 to be passed into the water extractive distillation tower T-2 wherein the operation is the same as in Fig. 1. The concentrating column T-3 functions in the same manner as in Fig. 1 for concentrating the alcohol from the dilute aqueous bottoms withdrawn from T-2.

A preferred method of operating in finishing a crude ethanol from hydration of ethylene is shown in the following example:

EXAMPLE I

In a specific operation the conditions for carrying out water rejection in column T-1, water extractive distillation in T-2 and concentration in T-3 are summarized in the following table for brevity.

Table I

3 TOWER OPERATION

|  | T-1 | T-2 | T-3 |
|---|---|---|---|
| No. of Plates | 40 | 40 | 55 |
| Feed Plates | 20 | 20 | 15 |
| Temperatures, °C.: |  |  |  |
| Feed | 50 | 85 | 85 |
| Overhead | 67 | 78-80 | 78 |
| Bottoms | 101 | 88-90 | 100-102 |
| External Reflux Ratio | 50/1 | 100/1 | 84/1 |
| Percent Purged Overhead | 4-5 | 0.75 | 1.5 |

Comparative tests were conducted to determine whether the water rejection technique of the present invention is capable of giving a superior product. In the quality tests employed the permanganate time was used to indicate the freedom of the alcohol from materials which undergo reaction with potassium permanganate. This is measured by the time in minutes which is taken for a 3% aqueous $KMnO_4$ solution to oxidize the impurities. Another important test is one designed to measure the miscellaneous organic impurities, abbreviated M. O. I.

This test involves the determination of the light absorbing impurities at 5500 A. units.

The salient data showing meritorious improvement in the quality of ethanol finished with the water injection technique of the present invention is shown in the following table:

Table II

QUALITY OF OLEFIN HYDRATION ETHANOL FINISHED BY SEVERAL METHODS

| Quality Test | Conventional Without Extractive Distillation | Conventional With Extractive Distillation | Extractive Distillation With Water Rejection | Best Quality Fermentation Alcohol |
|---|---|---|---|---|
| P. M. T., min | 5 to 15 | 18 to 35 | 45 to 52 | 50 to 60. |
| M. O. I. at 5,500 A | 0.4 | 0.03-0.05 | 0.03-0.05 | 0.05. |
| Odor | very poor. | poor | good | good to excellent. |
| Odor Class (USI-2) | 100+ | 12 | 2 to 3 | 2. |

The data in the above Table II shows that the ethanol product finished with water rejection prior to extractive distillation is equivalent to the best fermentation alcohol.

EXAMPLE II

The effectiveness of the water rejection technique has also been demonstrated on two widely varying isopropanol crudes. These crudes, prepared by the strong acid process from propylene, are contaminated with chemical type impurities similar to those in crude ethanol. In addition, crude isopropanol contains larger amounts of sulfur-containing impurities due to the higher sulfur content of the propylene feed compared to ethylene feed. Isopropanol finished from these crudes tend to be contaminated with two basic odor-type impurities: Butyl odor or hydrocarbon type odor, and recycle odor or sulfur type odor.

Under conventional plant finishing conditions, these isopropanol crudes yield only fair to poor odor quality alcohol (class 3 only occasionally, generally class 5 to 12 on a relative basis where the best known isopropanol=class 2). The following examples demonstrate the effectiveness of water rejection finishing on these two different odor type isopropanol crudes.

WATER REJECTION FINISHING OF CRUDE ISOPROPANOL
[Unit: 4 tower water rejection as in Figure 2.]

| Run 998 | 130 | 131 |
|---|---|---|
| Crude Odor Type | Butyl | Recycle |

| Operating Data | Stream Rates, Vol. Percent on Crude Alcohol Feed | |
|---|---|---|
| T-1 ohd | 6.8 | 6.9 |
| T-2 ohd | 1.7 | 1.8 |
| Recycle solvent | 150 | 150 |
| T-3 ohd | 1.3 | 0.96 |
| Alcohol Stream | 47.0 | 42.8 |
| Highboiler Side Stream | 2.5 | 2.9 |
| T-4 Highboiler Side Stream | 5.5 | 10.4 |
| Quality of Product Alcohol—Odor Class | 2 | 2 |

To determine how the water rejection process of the present invention changes the course of critical impurities in the system compared to the conventional operations, material balance studies were made. The comparative material balance data are shown in the following Tables III and IV.

Table III
MATERIAL BALANCE DATA

| | Volume Percent Distribution of Total Impurities | |
|---|---|---|
| | With Water Rejection from T-1 | Conventional Extractive Distillation Finishing |
| T-1 Overhead | 4.6 | 19.6 |
| T-2 Overhead | 18.7 | 51.5 |
| T-3 Overhead | 0.2 | 2.0 |
| T-3 Product | 2.6 | [2] 26.9 |
| T-3 Bottoms | 0 | 0 |
| T-1 Water Rejection Bottom Streams | [1] 73.6 | |
| Percent Material Balance | 99.7 | 100.0 |
| Product Quality: | | |
| P. M. T., min | 45 | 5.0 |
| M. O. I., 5,500 A | 0.033 | 0.039 |
| Odor (Relative) | Less than 2 | 2 |

[1] 67.5 as aldol.
[2] As crotonaldehyde.

The above compared data were obtained by analyzing the streams when treating a 35 volume percent aqueous fermentation ethanol containing added aldol and crotonaldehyde in the proportions that these impurities tend to be present in a crude olefin hydration alcohol (9.1 p. p. m. aldol and 1.7 p. p. m. crotonaldehyde.

It can be readily seen that with the water rejection operation well over 70% of the total impurities were purged in the initial water rejection column (T-1 bottoms). Most of the aldol impurities were those removed and not given an opportunity to undergo decomposition in the later distillation stages. When the water rejection was omitted in the initial tower T-1 substantially all the aldol remained with aqueous alcohol, only a small part of the crotonaldehyde impurities being separated as a low boiling impurity. Subsequently without water rejection all the aldol underwent decomposition in the water extractive distillation and final rectification towers, thus giving the rectified alcohol product a high unsaturated aldehyde content which showed up in a poor (low) permanganate time. Thus, it is shown that the aldol type impurities dehydrate and form unsaturated carbonyls under the water extractive distillation conditions, whereby unsaturated carbonyls remain with the ethanol instead of being separated therefrom either under the water extractive distillation conditions or under ordinary rectification conditions.

Table IV
MATERIAL BALANCE DATA
[Feed: 35% aqueous fermentation ethanol containing 6.8 p. p. m. of Dowtherm A.]

| Stream | Volume % Distribution of Total Impurities | |
|---|---|---|
| | With Water Rejection | Conventional Water Extractive Distillation |
| T-1 ohd | 3.0 | 1.9 |
| T-2 ohd | 29.8 | 80.9 |
| T-3 ohd | [1] | [1] |
| T-3 Product | [1] | [1] |
| T-3 Bottoms | 17.3 | 17.2 |
| T-1 Water Rejection Bottom Streams | 49.9 | |
| Percent Material Balance | 100.0 | 100.0 |
| Product Quality: | | |
| P. M. T., min | 50 | 46 |
| M OI, 5,500 A | 0.025 | 0.025 |
| Odor (Relative) | 2 | 5 |

[1] Not measurable.

With water rejection conditions, about 50% of the Dowtherm in the feed is purged in the water rejection tower bottoms stream. This removal of Dowtherm reduces the load on the water extractive tower thus permitting more efficient removal of the remaining Dowtherm in this tower. Under conventional finishing conditions, while more Dowtherm is removed overhead (81 vs. 30%) more Dowtherm gets into T-3 as evidenced by the degraded odor.

The invention described as claimed as follows:

1. In the finishing of a crude alcohol formed by hydration of $C_2$ to $C_4$ olefin in which characteristic low-boiling impurities include ether and higher-boiling impurities including aldol, unsaturated aldehyde, polymer, and sulfur compounds, the improvement which comprises initially fractionally distilling the crude alcohol diluted with above 25 volume percent of water to distill the low-boiling impurities including the ether as a light fraction and to distill the alcohol with about an azeotropic amount of water as an intermediate fraction taken as a side stream from an aqueous bottoms portion containing a major proportion of the water with said high-boiling impurities dissolved therein, passing said intermediate aqueous alcohol azeotrope fraction freed of the low-boiling and higher boiling impurities to a water extractive distillation zone, distilling a remaining small amount of low and higher-boiling impurities from the alcohol diluted by water in said extractive distillation zone, then rectifying the alcohol from dilute aqueous bottoms withdrawn from the extractive distillation zone.

2. In a process of finishing a crude alcohol formed by hydration of a $C_2$ to $C_4$ olefin in which characteristic higher boiling impurities are aldols of the alcohol, unsaturated aldehydes, diphenyl ether, diphenyl, and sulfur compounds, the steps which comprise fractionally distilling the crude alcohol diluted to contain at least 25 volume percent water in a fractional distillation zone to reject as bottoms an aqueous residue which amounts to at least 60 volume percent of said diluted alcohol, fractionating vapors separated from the rejected water bottoms to separate as a side stream alcohol with about an azeotropic amount of water and substantially freed of said higher-boiling impurities, passing said aqueous azeotrope of the alcohol into a water extractive distillation zone, distilling low-boiling and high-boiling impurities from the aqueous alcohol in the water extractive distillation zone in the presence of a liquid reflux containing above 70 mole percent water, passing the residual portion of the aqueous reflux from the water extractive distillation zone to a rectifying zone, and recovering a rectified distillate of the alcohol.

3. In the process of finishing a crude ethyl alcohol formed by hydration of ethylene, said crude alcohol containing low-boiling impurities including ether and higher-boiling impurities including aldol, the improvement of fractionally distilling the crude alcohol diluted with 50 to 70 volume percent water to remove low-boiling impurities overhead and to separate as a side stream the alcohol with about an azeotropic amount of water as an intermediate fraction from an aqueous residue containing the aldol, then passing the said intermediate fraction freed of the aldol into a water extractive distillation zone wherein a remaining small amount of impurities is distilled from the alcohol in an equeous solution containing above 70 mole percent water.

4. In the process defined by claim 3 said crude ethyl alcohol containing among other higher-boiling impurities difficult to remove by water extractive distillation diphenyl ether which is made to remain in the aqueous residue containing the aldol.

5. In the finishing of a crude alcohol formed by hydration of a $C_2$–$C_4$ olefin, said crude alcohol containing ether, aldol, hydrocarbon polymer, sulfur-containing organic compounds and unsaturated carbonyl impurities, the improvement which comprises diluting the crude alcohol with water so that the resulting aqueous alcohol contains above 25 volume percent of water, fractionally distilling the diluted aqueous crude alcohol to distill therefrom a low boiling impure fraction containing ether and as a side stream an intermediate fraction comprising alcohol with about an azeotropic amount of water thus leaving a dilute aqueous residue containing higher-boiling impurities including the aldol, then subjecting the intermediate fraction freed of the aldol to water extractive distillation with sufficient admixed water to make the aqueous alcohol undergoing the water-extractive distillation contain above 70 mole percent water, purging overhead in the water extractive distillation additional impurities, and rectifying the alcohol from the aqueous residue of the water extractive distillation.

References Cited in the file of this patent

UNITED STATES PATENTS

| | | |
|---|---|---|
| 2,382,044 | Fisher | Aug. 14, 1945 |
| 2,470,222 | Patterson | May 17, 1949 |
| 2,489,619 | Carlson et al | Nov. 29, 1949 |
| 2,561,680 | Willke | July 24, 1951 |
| 2,595,116 | Wilson | Apr. 29, 1952 |
| 2,638,440 | Drout et al | May 12, 1953 |
| 2,640,017 | Graff | May 26, 1953 |
| 2,663,682 | Traeger et al | Dec. 22, 1953 |
| 2,715,604 | Weaver | Aug. 16, 1955 |